United States Patent [19]

Althausen et al.

[11] 4,065,106
[45] Dec. 27, 1977

[54] MIXING HEAD FOR MACHINES FOR PRODUCING MULTICOMPONENT PLASTICS

[75] Inventors: Ferdinand Althausen, Neunkirchen; Reiner Raffel, Siegburg, both of Germany

[73] Assignee: Maschinen Fabrik Hennecke GmbH, Leverkusen, Germany

[21] Appl. No.: 575,848

[22] Filed: May 8, 1975

[30] Foreign Application Priority Data

May 15, 1974 Germany ............................ 2423492

[51] Int. Cl.$^2$ ............................................. B01F 15/00
[52] U.S. Cl. ...................................... 366/76; 251/206
[58] Field of Search .................... 259/4 R, 4 A, 4 AB, 259/4 AC, 18; 23/252; 251/206; 137/625.4; 425/4; 277/24

[56] References Cited

U.S. PATENT DOCUMENTS

| | | | |
|---|---|---|---|
| 2,836,198 | 5/1958 | McNeill | 251/206 |
| 3,893,481 | 7/1975 | Watts | 137/625.4 |
| 3,905,582 | 9/1975 | Fiorentini | 259/4 R |
| 3,908,966 | 9/1975 | Boden et al. | 259/4 R |

Primary Examiner—Richard E. Aegerter
Assistant Examiner—L. Footland
Attorney, Agent, or Firm—Gene Harsh; Joseph C. Gil; William E. Parry

[57] ABSTRACT

The present invention provides a mixing head having vertical lift slides in which the injection pressures can be altered. Each lift slide is provided with a number of injection openings of different diameters arranged in one plane perpendicular to the axis of the slide. The injection pressure is altered by rotating the lift slide to bring a different injection opening into registry with a mixing chamber. The head of each lift slide is provided with a head having change-over detents which mesh with a carrying yoke to facilitate changing injection openings. The lift slides may also be provided with return openings of such diameter that the pressure in the system remains the same whether the slides are in a mixing position or a return position.

7 Claims, 8 Drawing Figures

MIXING HEAD FOR MACHINES FOR PRODUCING MULTICOMPONENT PLASTICS

FIELD OF THE INVENTION

This invention relates to a mixing head for machines for producing multicomponent plastics, especially polyurethane-based foams, the machine comprising at least two hollow lift slides which are guided in bores of a housing, are connected together through a yoke, and whose inlet openings communicate with feedlines while their injection orifices, in the mixing position of the lift slides, open into a mixing chamber.

BACKGROUND OF THE INVENTION

In cases where it is desired to use mixing heads of this kind for producing plastics articles with different properties, it is often necessary to change the components and/or to inject them into the mixing chamber under different pressures. The injection pressure is governed by the size of the injection openings. If, in conventional slide type mixing heads, it is desired to change this pressure, at least one of the slides has to be taken out and replaced by another slide with an injection opening having a different cross-sectional area. Alternatively, a higher pressure has to be built up by increasing the output of the pumps delivering the components.

An object of the present invention is to provide a mixing head which enables the pressures under which the components are injected to be altered in stages without any need to replace a slide.

SUMMARY OF THE INVENTION

According to the invention there is provided a mixing head for a machine for producing multicomponent plastics, comprising a housing, and at least two hollow slides which are guided in bores in the housing are coupled together by a yoke, and have inlet openings which communicate with feedlines and injection openings which, in the mixing position of the slides, open into a mixing chamber, wherein the lift slides comprise a plurality of injection openings differing in cross-sectional area from one another and arranged in a single plane perpendicular to the axis of the slides and wherein the slides are provided with heads which carry change-over detents engaging with the yoke, the detents being so arranged that selected injection openings can be brought into communication with the mixing chamber.

DETAILED DESCRIPTION OF THE INVENTION

In this way, it is possible, under constant pump pressures, i.e., under constant pressures in the feedline system, to alter the injection pressure by selecting one or both injection openings with a different cross-sectional area. Differences in the viscosity of the components can be compensated by selecting injection openings with suitable cross-sectional areas, so that both components can be injected into the mixing chamber with the same force.

The change-over detents may have a variety of different configurations. It is possible, for example, to use a combination of grooves and ribs, a combination of a nose with associated holes, or to provide the heads of the lift slides with a characteristic contour which is provided with correspondingly shaped recesses in the bearing element of the yoke which carries the slides.

In one particular embodiment of the mixing head according to the invention, the lift slides have return openings which communicate with return lines and which are arranged in a second cross-sectional plane, the return openings corresponding in number to and being associated with the injection openings. The cross-sectional areas of the associated openings are such that the pressure loss in the pipe system during the mixing and return periods, i.e., throughout the entire operation, remains constant.

It is generally known that return lines can be used in mixing heads in order to establish substantially constant working conditions and because the intervals between the individual mold-filling cycles are relatively short the return lines enable the components to be continuously delivered under constant pressure conditions. In this way, there is no danger of gas bubbles being formed in the mixture.

Providing the injection openings and return openings are properly arranged, the outflow cross-sections from the lift slides can be kept constant over the entire period of operation, for example, by the return openings being gradually released during an equally gradual closure of the injection openings by the housing wall when the lift slides are returned. In the ideal case, the cross-sectional areas of the associated openings are equal in size. However, this assumes that the pressure losses, especially in the return system, are negligible, and in practice in order to adapt the pressure losses in the return system to those in the feed system, the return openings have to be larger.

BRIEF DESCRIPTION OF THE DRAWINGS

Two exemplary embodiments of the mixing head according to the invention are described in more detail below and diagrammatically illustrated in the accompanying drawings, wherein.

Figure 1:
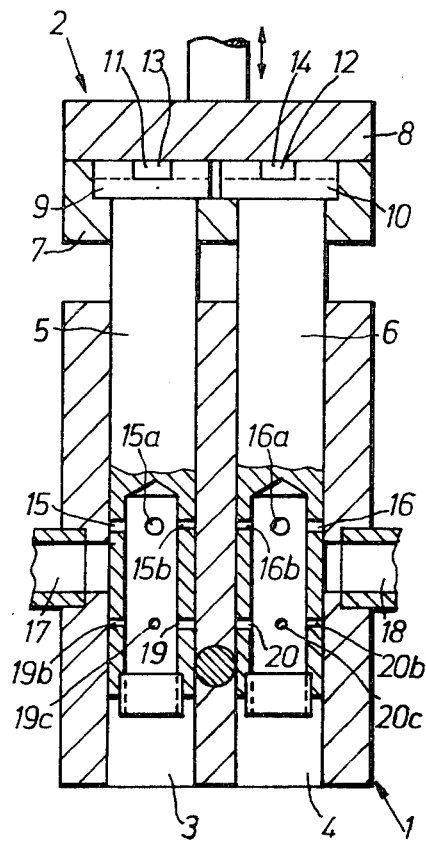
FIG. 1 is a longitudinal section through a first embodiment of the mixing head without any return lines and with the slides in the rest position.
Figure 2:
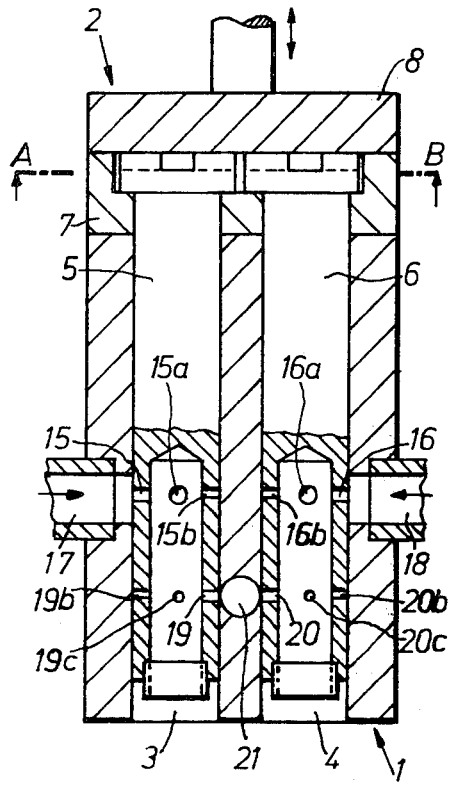
FIG. 2 is a longitudinal section through the mixing head shown in FIG. 1 with the slides in the mixing position.
Figure 3:
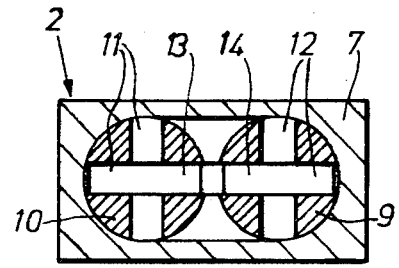
FIG. 3 is a section on the line A-B in FIG. 2.

The mixing head shown in FIGS. 1 to 3, comprises a housing 1 and a yoke 2. Lift slides 5 and 6 are guided in bores 3 and 4 respectively in the housing 1. The slides are mounted in the yoke 2 between a bearing element 7 and a fixing plate 8. Change-over detents, consisting of grooves 11 and 12 formed in heads 9 and 10 respectively of the slides 5 and 6 and ribs 13 and 14 correspondingly arranged on the closure plate and engaging in the grooves 11 and 12 respectively enable the slides 5 and 6, to be changed over to openings of different cross-section. These openings are inlet openings 15, 15a, 15b, and 16, 16a, 16b and additional inlet openings which are colinear with the openings 15a and 16a and are situated in front of the plane of the drawing and, for this reason, cannot be seen. The inlet openings of the slide 5 cooperate, for example, with the feedline 17, while the inlet openings of the lift slide 6 cooperate with the feedline 18. Injection openings 19, 19b, 19c and 20, 20b, 20c are arranged in a plane which is spaced from that containing the inlet openings. Each slide 5 and 6 has an additional injection opening coinciding with the injection opening 19c/20c, which is situated in front of the plane of the drawing and, for this reason cannot be seen in the drawing. Each of the injection openings of a single slide (e.g. 19, 19b, 19c) has a different cross-section. Associated openings, for example, the inlet opening 15 and the injection opening 19 are offset through 180° C relative to one another.

In the mixing position of the slides 5 and 6 (FIG. 2), the components are injected through the injection openings 19 and 20 into a mixing chamber 21. This mixing chamber is arranged perpendicularly to the plane of movement of the lift slides 5 and 6 and opens into the sprue of a mold (not shown).

Figure 4:
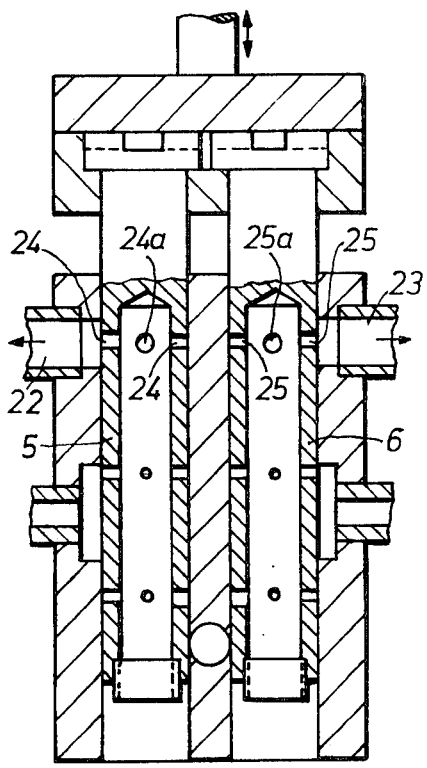
FIG. 4 is a longitudinal section through a second embodiment of the mixing head with return lines and with the slides in the rest position.
Figure 5:
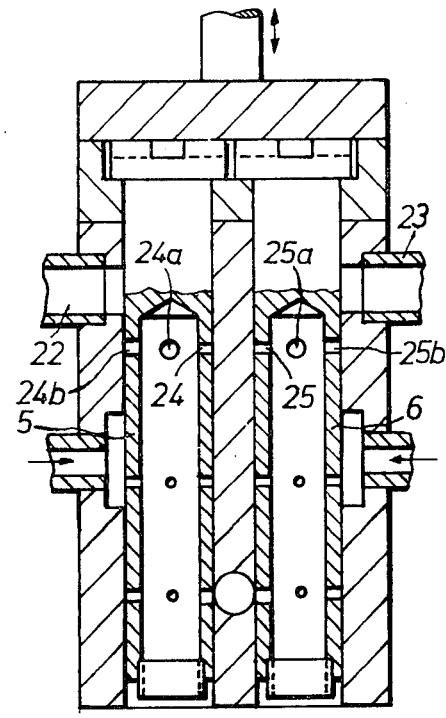
FIG. 5 is a longitudinal section through the mixing head shown in FIG. 4 with the slides in the mixing position.

The only difference between the mixing head shown in FIGS. 4 and 5 and the mixing head shown in FIGS. 1 to 3 is that a return system is provided in the mixing head shown in FIGS. 4 and 5. The system consists of return lines 22 and 23 with which return openings 24, 24a, 24b and 25, 25a, 25b arranged in the slides 5 and 6 are associated. Each slide 5 and 6 comprises a further return opening coinciding with the return opening 24a/25a, which is situated in front of the plane of the drawing and, for this reason, cannot be seen in the drawing.

Figures 6, 7:
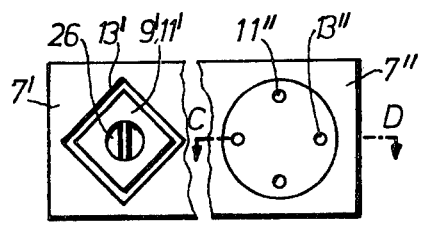
FIG. 6 shows one embodiment of the change-over detents in a plan view of the bearing element of the yoke.
FIG. 7 shows another embodiment of the change-over detents in a plan view of the bearing element of the yoke.

FIG. 6 shows a head 9' of one lift slide. The head is in the form of a square 11' which is held in a corresponding square recess 13' in the bearing element 7'. The head 9' comprises a stirrup 26 by which the lift slide can be lifted out and changed around.

Figure 8:
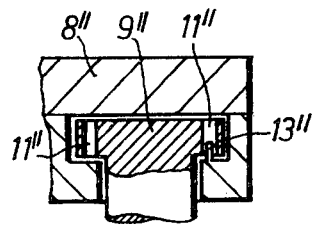
FIG. 8 is a section on the line C-D in FIG. 7.

The change-over detent illustrated in FIGS. 7 and 8 consists of bores 11" arranged in the head 7" and engaged by a pin 13"'. The head 9" of the lift slide is covered by a fixing plate 8".

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A mixing head for a machine for producing multi-component plastics, comprising a housing, and at least two hollow slides which are guided in bores in the housing, said slides being coupled together by a yoke and having inlet openings which communicate with feedlines and injection openings which, in the mixing position of the slides, open into a mixing chamber, wherein the lift slides have a plurality of injection openings differing in cross-sectional area from one another, arranged in a single plane perpendicular to the axis of the slides and wherein the slides are provided with heads which carry changeover detents engaging with the yoke the detents being so arranged that selected injection openings can be brought into communication with the mixing chamber.

2. A mixing head as claimed in claim 1, wherein the slides are provided with return openings which communicate with return lines are arranged in a second plane spaced from the said single plane, and correspond in number to, and communicate with, the injection openings, the cross-sectional areas of the associated openings being such that the mixing head presents a constant resistance to through flow throughout the mixing and return periods.

3. A mixing head for a machine for producing multi-component plastics comprising a housing and at least two hollow slides which are guided in bores in the housing, said slides being coupled together by a yoke and each slide having a number of injection openings of varying cross-section arranged in a first plane perpendicular to its axis and a number of inlet openings arranged in a second plane, parallel to and spaced from said first plane, each injection opening being so coupled with an inlet opening such that when the injection opening opens into a mixing chamber its coupled inlet opening communicates with a feedline, and each slide having a head which carrys detents which engage the yoke and which are so arranged that a selected injection opening can be brought into communication with the mixing chamber.

4. A mixing head as claimed in claim 3 wherein the slides are provided with return openings arranged in a plane parallel to and spaced from said first plane, each return opening being coupled with an injection opening such that when the injection opening is out of communication with the mixing chamber the return opening is in communication with a return line and each return opening having such a cross-sectional area that it causes the same pressure drop in the return system as its associated injection opening causes when it is in communication with the mixing chamber.

5. A mixing head as claimed in claim 4 wherein the cross-section of each return opening is larger than that of its associated injection opening.

6. A mixing head as claimed in claim 5 wherein the detents are square protuberances on the top of the slides.

7. A mixing head as claimed in claim 5 wherein the detents comprise bores in a portion of the slide heads which overhang their slide's bodies, said bores being engaged by pins in the yoke.

* * * * *